(12) United States Patent
Lee et al.

(10) Patent No.: US 11,740,504 B1
(45) Date of Patent: Aug. 29, 2023

(54) CURVED PANEL AND MANUFACTURING METHOD THEREOF

(71) Applicant: AUO Corporation, Hsinchu (TW)

(72) Inventors: Chun-Yu Lee, Hsinchu (TW);
Sheng-Yuan Chiu, Hsinchu (TW);
Yen-Chang Chen, Hsinchu (TW);
Po-Shu Huang, Hsinchu (TW);
Ho-Hsiang Wang, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 17/884,565

(22) Filed: Aug. 10, 2022

(30) Foreign Application Priority Data

Mar. 22, 2022 (TW) .................................. 111110665

(51) Int. Cl.
*G02F 1/1333* (2006.01)
*G02F 1/1335* (2006.01)
*G02F 1/1339* (2006.01)

(52) U.S. Cl.
CPC .... *G02F 1/133562* (2021.01); *G02F 1/13394* (2013.01); *G02F 1/133331* (2021.01); *G02F 1/133528* (2013.01); *G02F 2201/56* (2013.01)

(58) Field of Classification Search
CPC ........... G02F 1/133305; G02F 2202/28; G02F 1/1339; G02F 1/133331
See application file for complete search history.

(56) References Cited

U.S. PATENT DOCUMENTS

| 9,575,369 | B2 | 2/2017 | Chiang et al. | |
|---|---|---|---|---|
| 2012/0020056 | A1* | 1/2012 | Yamagata | G09F 9/33 361/679.01 |
| 2015/0076722 | A1 | 3/2015 | Chiang et al. | |
| 2017/0075444 | A1* | 3/2017 | Nade | H04M 1/0269 |
| 2017/0123245 | A1* | 5/2017 | Iwai | G02F 1/133305 |
| 2018/0284522 | A1* | 10/2018 | Tsuda | G02F 1/133305 |
| 2018/0364834 | A1* | 12/2018 | Kwon | G06F 3/0446 |
| 2019/0324310 | A1* | 10/2019 | Kudo | G02F 1/13338 |
| 2020/0050056 | A1* | 2/2020 | Asakura | G02F 1/13338 |

(Continued)

FOREIGN PATENT DOCUMENTS

| CN | 104460056 | 5/2017 |
|---|---|---|
| CN | 110794988 | 2/2020 |
| CN | 113380150 | 9/2021 |

*Primary Examiner* — Jonathan Y Jung
(74) *Attorney, Agent, or Firm* — JCIPRNET

(57) ABSTRACT

A curved panel includes a first curved substrate, a second curved substrate, a curved coverlens, and an adhesive structure. The first curved substrate and the second curved substrate are overlapped with each other. First to fourth sidewalls of the first curved substrate correspond to fifth to eighth sidewalls of the second curved substrate, respectively. The first to third sidewalls of the first curved substrate extend beyond the fifth to seventh sidewalls of the second curved substrate, respectively. The second curved substrate is located between the curved coverlens and the first curved substrate. The second curved substrate is bonded to the curved coverlens through an adhesive layer. The adhesive structure is located between the first curved substrate and the curved coverlens and is laterally located between the first sidewall and the fifth sidewall, between the second sidewall and the sixth sidewall, and between the third sidewall and the seventh sidewall.

13 Claims, 17 Drawing Sheets

(56) References Cited

U.S. PATENT DOCUMENTS

| | | | |
|---|---|---|---|
| 2020/0166809 A1* | 5/2020 | Kiyota | G02F 1/1339 |
| 2020/0301192 A1* | 9/2020 | Huang | G02F 1/133308 |
| 2021/0214482 A1* | 7/2021 | Morita | C08F 226/06 |
| 2022/0068746 A1* | 3/2022 | Chen | H01L 24/19 |

* cited by examiner

CURVED PANEL AND MANUFACTURING METHOD THEREOF

CROSS-REFERENCE TO RELATED APPLICATION

This application claims the priority benefit of Taiwan application serial no. 111110665, filed on Mar. 22, 2022. The entirety of the above-mentioned patent application is hereby incorporated by reference herein and made a part of this specification.

BACKGROUND

Technical Field

The disclosure relates to a panel; more particularly, the disclosure relates to a curved panel and a manufacturing method thereof.

Description of Related Art

With the advancement of science and technology, curved displays have been applied more and more extensively. For instance, curved display devices have been widely used in mobile phones, televisions, automotive panels, wearable display devices, and so on. The display devices that are often used in people's daily lives may be designed to have curved surfaces to improve user experience, which also indicates that the market potential of the curved display devices is considerable.

In the related art, a curved display panel is formed by bending a display panel. However, the display panel is prone to residual stress after being bent, and the residual stress at edges or corners of the display panel is the most significant, which leads to uneven distribution of the residual stress on the display panel. When the residual stress on the display panel is unevenly distributed, light leakage is likely to occur after the display panel is assembled. Therefore, a method that may solve said issue is in urgent need.

SUMMARY

The disclosure provides a curved panel capable of mitigating an issue of uneven distribution of residual stress on the panel after the panel is bent.

The disclosure provides a manufacturing method of a curved panel for mitigating an issue of uneven distribution of residual stress on the panel after the panel is bent.

At least one embodiment of the disclosure provides a curved panel, and the curved panel includes a first curved substrate, a second curved substrate, a curved coverlens, and an adhesive structure. The first curved substrate and the second curved substrate are overlapped with each other. A first sidewall, a second sidewall, a third sidewall, and a fourth sidewall of the first curved substrate correspond to a fifth sidewall, a sixth sidewall, a seventh sidewall, and an eighth sidewall of the second curved substrate, respectively. The first sidewall, the second sidewall, and the third sidewall of the first curved substrate respectively extend beyond the fifth sidewall, the sixth sidewall, and the seventh sidewall of the second curved substrate. The second curved substrate is located between the curved coverlens and the first curved substrate, and the second curved substrate is bonded to the curved coverlens through an adhesive layer. The adhesive structure is located between the first curved substrate and the curved coverlens and laterally located between the first sidewall and the fifth sidewall, between the second sidewall and the sixth sidewall, and between the third sidewall and the seventh sidewall.

At least one embodiment of the disclosure provides a curved panel, and the curved panel includes a first curved substrate, a second curved substrate, a curved coverlens, and an adhesive structure. The first curved substrate and the second curved substrate are overlapped with each other. A first sidewall, a second sidewall, a third sidewall, and a fourth sidewall of the first curved substrate correspond to a fifth sidewall, a sixth sidewall, a seventh sidewall, and an eighth sidewall of the second curved substrate, respectively. The second curved substrate is located between the curved coverlens and the first curved substrate, and the second curved substrate is bonded to the curved coverlens through an adhesive layer. The adhesive structure is located on a surface of the curved coverlens facing the second curved substrate and covers the first sidewall of the first curved substrate and the fifth sidewall of the second curved substrate. The adhesive structure includes a cured liquid adhesive, wherein an elastic modulus of the cured liquid adhesive is 0.265 MPa to 20 MPa.

At least one embodiment of the disclosure provides a manufacturing method of a curved panel, and the manufacturing method includes following steps. A first substrate and a second substrate overlapped with each other, are provided wherein a first sidewall, a second sidewall, a third sidewall, and a fourth sidewall of the first substrate correspond to a fifth sidewall, a sixth sidewall, a seventh sidewall, and an eighth sidewall of the second substrate respectively. The second substrate is bonded to a coverlens through an adhesive layer. The first substrate is bonded to the coverlens through an adhesive structure. The first substrate, the second substrate, and the coverlens are bent to form a first curved substrate, a second curved substrate, and a curved coverlens.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 1A to FIG. 3A are schematic top views of a manufacturing method of a curved panel according to an embodiment of the disclosure.

FIG. 1B to FIG. 3B are schematic cross-sectional views of a line A-A' depicted in FIG. 1A to FIG. 1C.

FIG. 1C to FIG. 3C are schematic cross-sectional views of a line B-B' depicted in FIG. 1A to FIG. 1C.

FIG. 6A to FIG. 8A are schematic top views of a manufacturing method of a curved panel according to an embodiment of the disclosure.

FIG. 6B to FIG. 8B are schematic cross-sectional views of a line A-A' depicted in FIG. 6A to FIG. 6C.

FIG. 6C to FIG. 8C are schematic cross-sectional views of a line B-B' depicted in FIG. 6A to FIG. 6C.

DESCRIPTION OF THE EMBODIMENTS

FIG. 1A to FIG. 3A are schematic top views of a manufacturing method of a curved panel according to an embodiment of the disclosure. FIG. 1B to FIG. 3B are schematic cross-sectional views of a line A-A' depicted in FIG. 1A to FIG. 1C. FIG. 1C to FIG. 3C are schematic cross-sectional views of a line B-B' depicted in FIG. 1A to FIG. 1C.

Figure 1A:
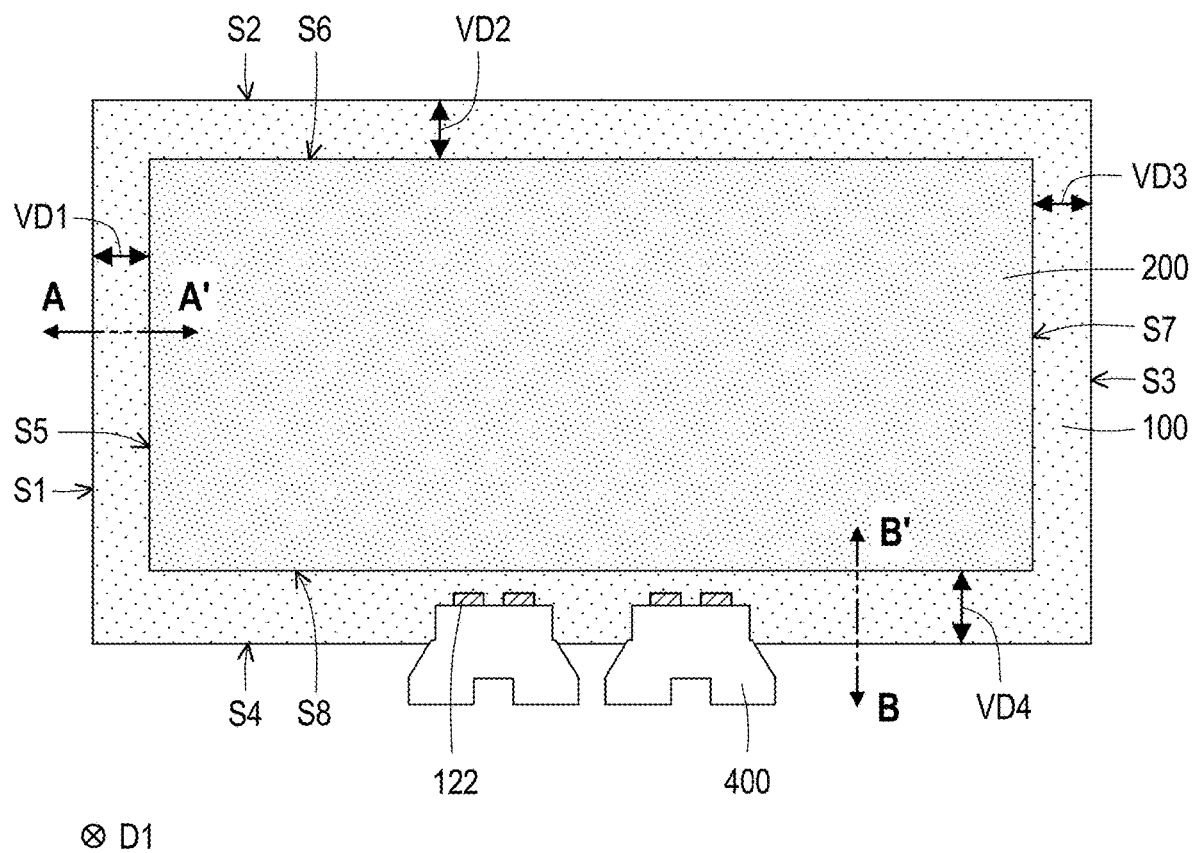
Figure 1B:
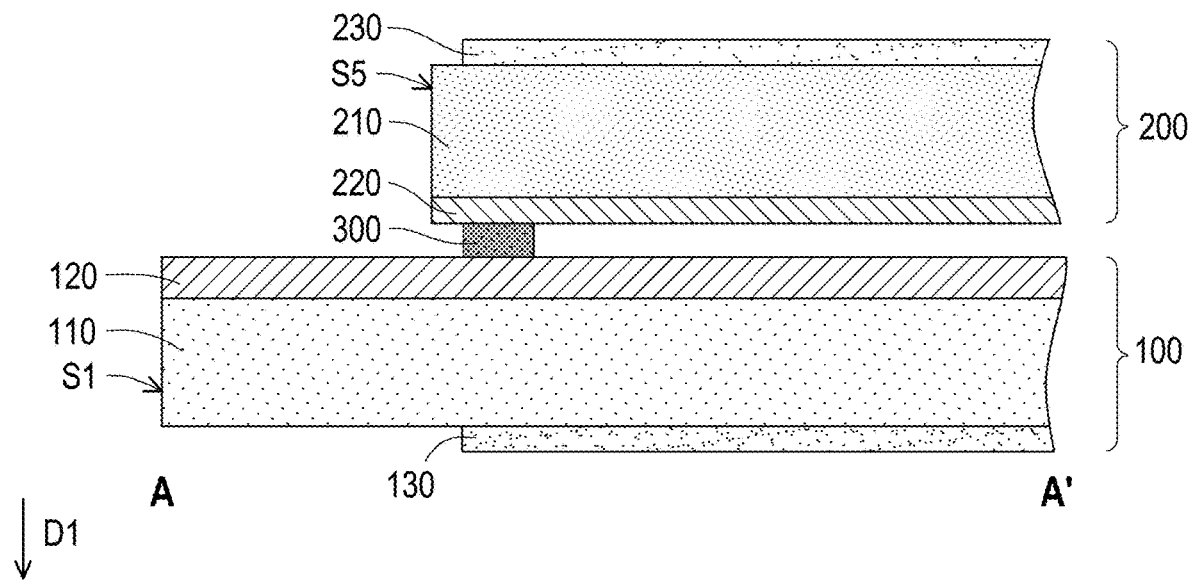
Figure 1C:
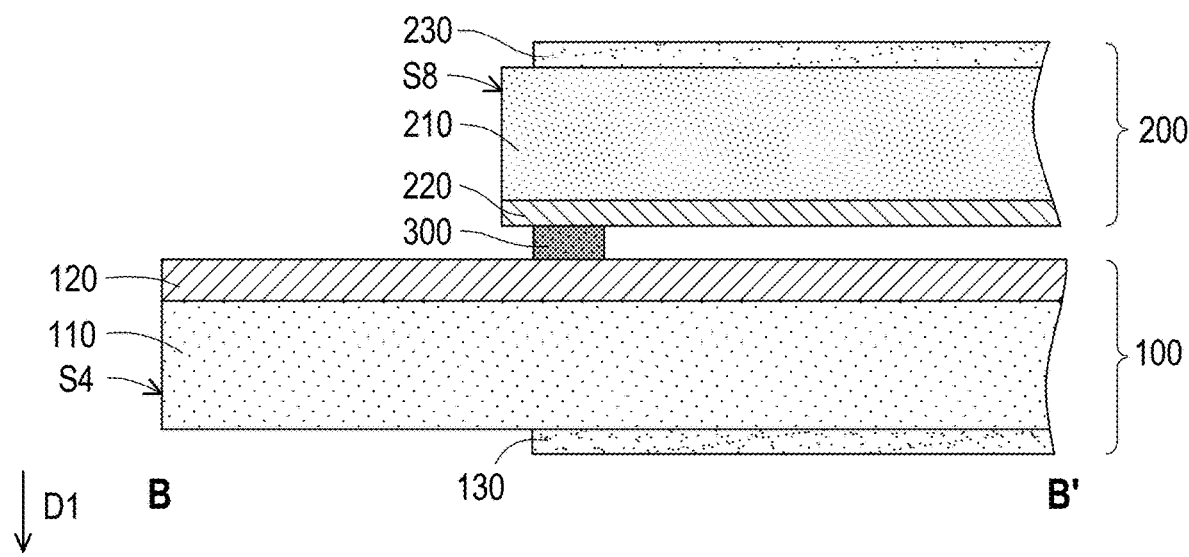

With reference to FIG. 1A to FIG. 1C, a first substrate 100 and a second substrate 200 that are overlapped with each other are provided. A first sidewall S1, a second sidewall S2, a third sidewall S3, and a fourth sidewall S4 of the first substrate 100 correspond to a fifth sidewall S5, a sixth sidewall S6, a seventh sidewall S7, and an eighth sidewall S8 of the second substrate 200, respectively. In this embodiment, the first sidewall S1 of the first substrate 100 and the fifth sidewall S5 of the second substrate 200 face the same direction, the second sidewall S2 of the first substrate 100 and the sixth sidewall S6 of the second substrate 200 face the same direction, the third sidewall S3 of the first substrate 100 and the seventh sidewall S7 of the second substrate 200 face the same direction, and the fourth sidewall S4 of the first substrate 100 and the eighth sidewall S8 of the second substrate 200 face the same direction.

An area occupied by the first substrate 100 is greater than an area occupied by the second substrate 200. In a stacking direction D1 of the first substrate 100 and the second substrate 200, the first sidewall S1 to the fourth sidewall S4 of the first substrate 100 extend beyond the fifth sidewall S5 to the eighth sidewall S8 of the second substrate 200, respectively. In other words, according to this embodiment, the first sidewall S1 to the fourth sidewall S4 of the first substrate 100 are not aligned to the fifth sidewall S5 to the eighth sidewall S8 of the second substrate 200. In this embodiment, a horizontal distance VD1 between the first sidewall S1 and the fifth sidewall S5 is 0.5 millimeter to 1.0 millimeter, a horizontal distance VD2 between the second sidewall S2 and the sixth sidewall S6 is 0.5 millimeter to 1.0 millimeter, a horizontal distance VD3 between the third sidewall S3 and the seventh sidewall S7 is 0.5 millimeter to 1.0 millimeter, and a horizontal distance VD4 between the fourth sidewall S4 and the eighth sidewall S8 is 2.0 millimeters to 8.0 millimeters. In some embodiments, the horizontal distance VD4 is greater than the horizontal distance VD1, the horizontal distance VD2, and the horizontal distance VD3, which should however not be construed as a limitation in the disclosure. The horizontal distance VD1, the horizontal distance VD2, the horizontal distance VD3, and the horizontal distance VD4 may be adjusted according to actual demands.

In some embodiments, the first substrate 100 includes a base 110, a first device layer 120, and a first polarizer 130.

A material of the base 110 includes glass, quartz, organic polymer, or any other applicable material. In some embodiments, a thickness of the base 110 is within a range from 0.1 millimeter to 0.5 millimeter.

The first device layer 120 is located on the base 110. In some embodiments, the first device layer 120 includes a plurality of conductive layers and a plurality of insulation layers. For instance, the first device layer 120 includes bonding pads 122, a thin film transistor array, scan lines, data lines, and other devices, wherein FIG. 1A illustrates the bonding pads 122 of the first device layer 120, while the other parts of the first device layer 120 are omitted. In some embodiments, the first device layer 120 may further include a black matrix or a color filter device, so as to form a black matrix on array (BOA) structure or a color filter on array (COA) structure.

The first polarizer 130 is located on the base 110. In some embodiments, the first device layer 120 and the first polarizer 130 are respectively located on two opposite sides of the base 110, which should however not be construed as a limitation in the disclosure. In other embodiments, the first device layer 120 and the first polarizer 130 are located on the same side of the base 110. The first polarizer 130 may be an organic polarizing film, a metal grid polarizer, or any other suitable polarizer.

In some embodiments, the second substrate 200 includes a base 210, a second device layer 220, and a second polarizer 230 (not shown in FIG. 1A).

A material of the base 210 includes glass, quartz, organic polymer, or any other applicable material. In some embodiments, a thickness of the base 210 is within a range from 0.1 millimeter to 0.5 millimeter.

The second device layer 220 is located on the base 210. In some embodiments, the second device layer 220 includes a common electrode, a black matrix, a color filter device, and other devices.

The second polarizer 230 is located on the base 210. In some embodiments, the second device layer 220 and the second polarizer 230 are respectively located on two opposite sides of the base 210, which should however not be construed as a limitation in the disclosure. In other embodiments, the second device layer 220 and the second polarizer 230 are located on the same side of the base 210. The second polarizer 230 may be an organic polarizing film, a metal grid polarizer, or any other suitable polarizer.

The first substrate 100 and the second substrate 200 are bonded to each other through a sealant 300. The sealant 300 surrounds a display region of the panel. In some embodiments, a liquid crystal layer is further arranged between the first substrate 100 and the second substrate 200, wherein the liquid crystal layer is surrounded by the sealant 300.

A flexible circuit board 400 is bonded to the bonding pads 122 of the first substrate 100, wherein the bonding pads 122 are laterally located between the fourth sidewall S4 of the first substrate 100 and the eighth sidewall S8 of the second substrate 200. In some embodiments, the flexible circuit board 400 includes a chip on film (COF) package, which should however not be construed as a limitation in the disclosure. In other embodiments, the bonding pads 122 are not connected to the flexible circuit board 400 but are electrically connected to other devices on the back side of the first substrate 100 through a side electrode (not shown), wherein the side electrode is directly deposited on the fourth sidewall S4 of the first substrate 100.

Figure 2A:
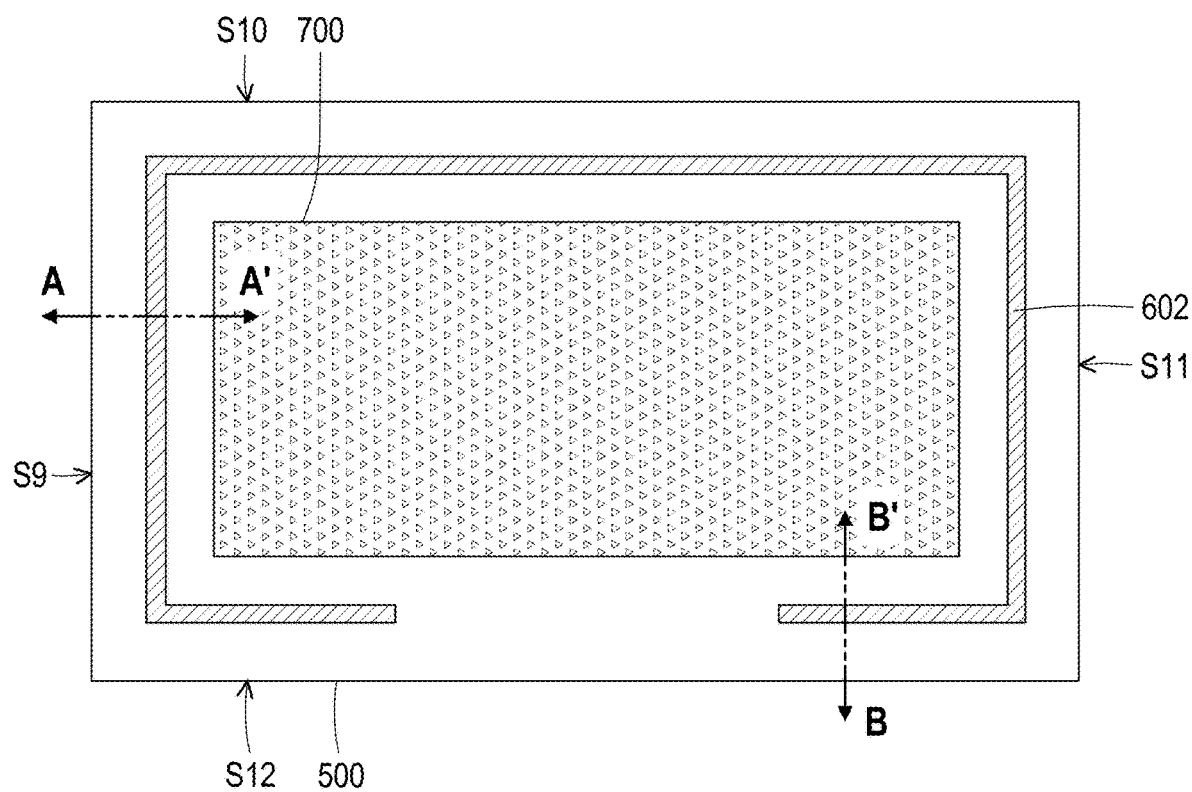
Figure 2B:
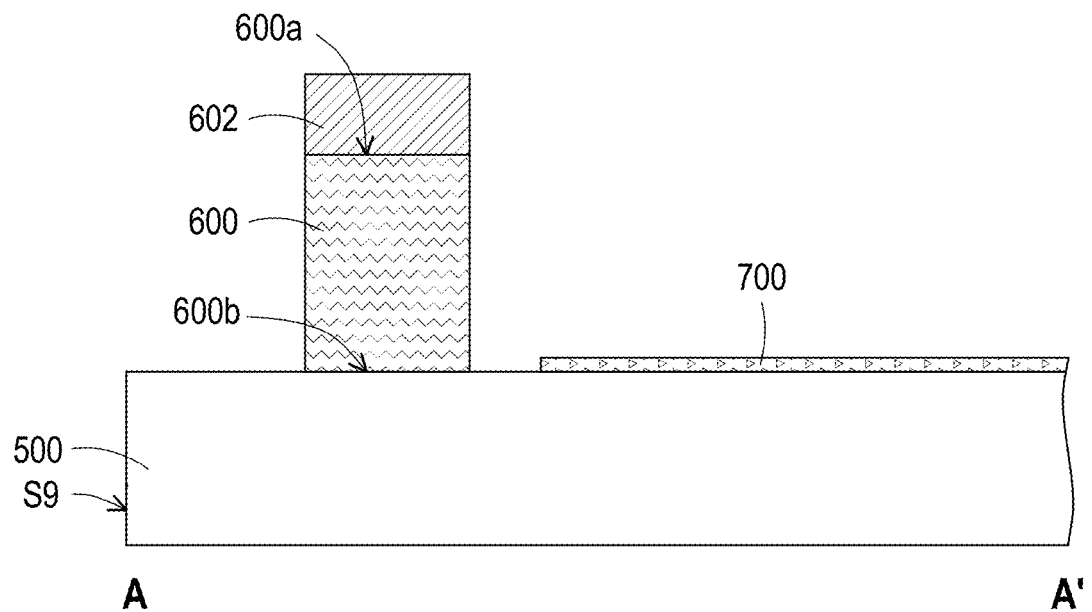
Figure 2C:
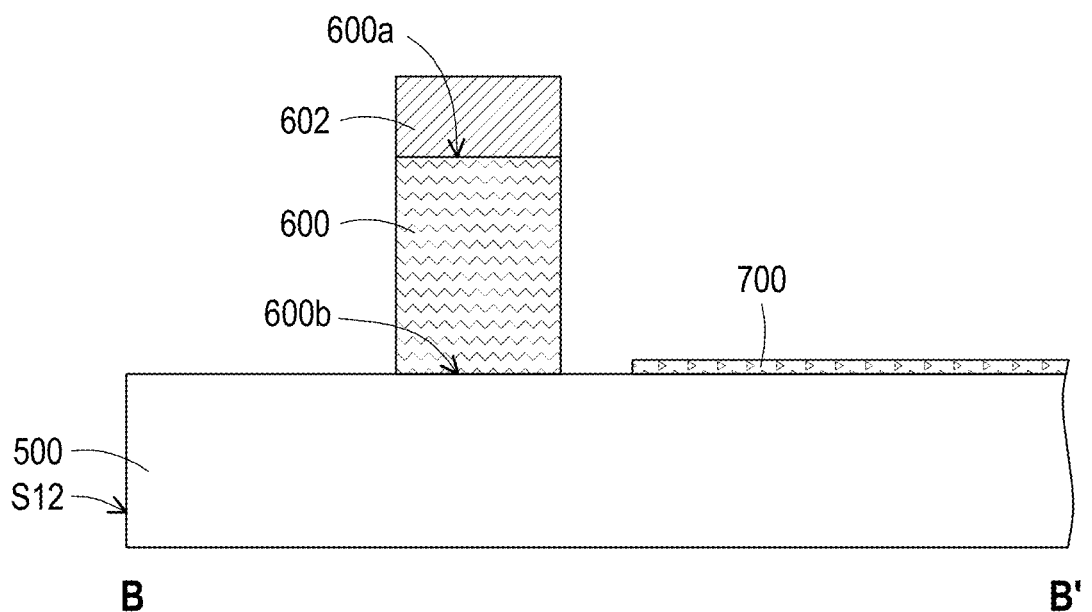

With reference to FIG. 2A to FIG. 2C, a coverlens 500 is provided. The coverlens 500 includes a ninth sidewall S9, a tenth sidewall S10, an eleventh sidewall S11, and a twelfth two sidewall S12.

An adhesive layer 700 is formed on the coverlens 500. In some embodiments, the adhesive layer 700 is a solid sheet-like optical clear adhesive (OCA), which should however not be construed as a limitation in the disclosure. In other embodiments, the adhesive layer 700 is a liquid adhesive, such as a liquid optical clear adhesive (LOCA) or optical clear resin (OCR). In some embodiments, a thickness of the adhesive layer 700 is 100 micrometers to 1000 micrometers.

An adhesive structure 600 is formed on the coverlens 500. In this embodiment, the adhesive structure 600 includes a double-sided adhesive, and a material of the double-sided adhesive is, for instance, an acrylic-based adhesive foam material. A de-bonding layer 602 is arranged on a surface of the adhesive structure 600. The adhesive structure 600 and the de-bonding layer 602 are adhered to the coverlens 500, wherein the de-bonding layer 602 is located on a first side 600a of the adhesive structure 600, and a second side 600b of the adhesive structure 600 is adhered to the coverlens 500.

In other embodiments, the adhesive structure 600 includes a liquid adhesive, and a material of the liquid adhesive is, for instance, an acrylic-based or silica-gel-based liquid adhesive. A method of forming the liquid adhesive includes coating or other suitable processes. When the adhesive structure 600 is the liquid adhesive, no de-bonding layer 602 is formed on the surface of the adhesive structure 600.

A thickness of the adhesive structure 600 is greater than the thickness of the adhesive layer 700. In some embodiments, the thickness of the adhesive structure 600 is 300 micrometers to 1700 micrometers. In some embodiments, the adhesive structure 600 and the adhesive layer 700 are separated from each other, which should however not be construed as a limitation in the disclosure. In other embodiments, the adhesive structure 600 and the adhesive layer 700 are in contact with each other.

Figure 3A:
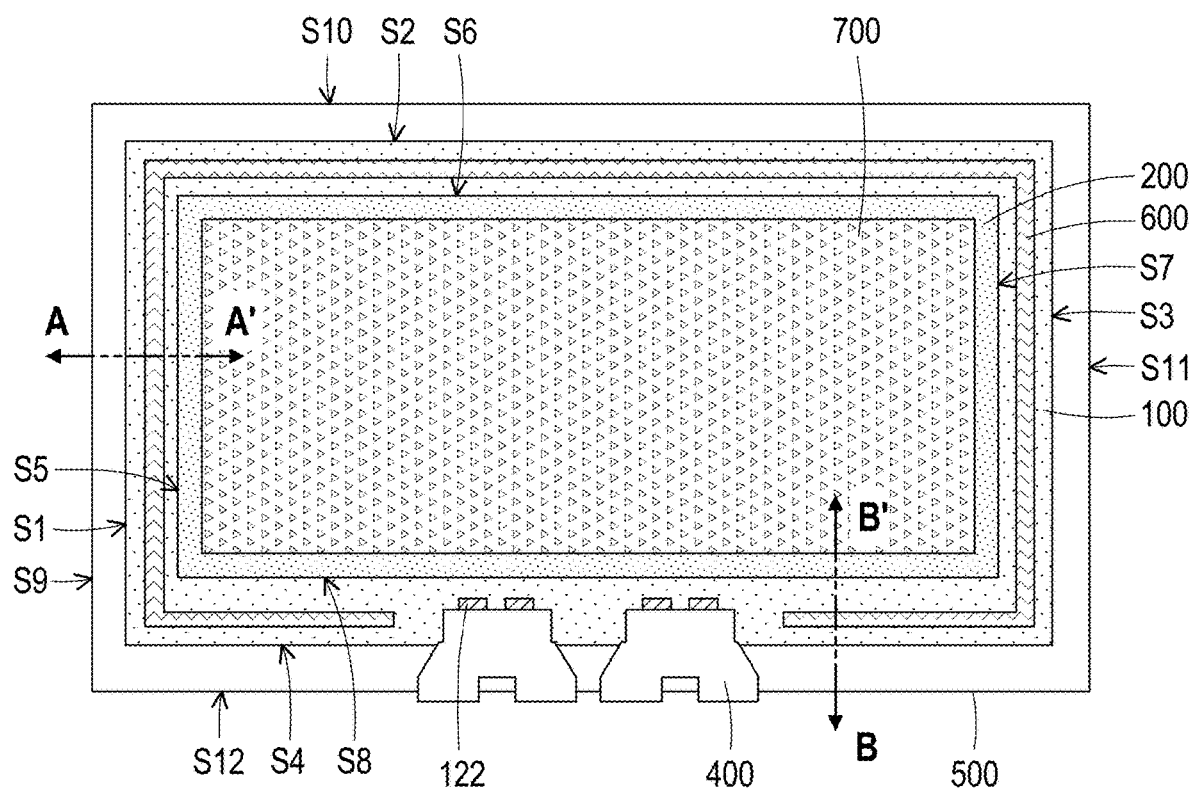
Figure 3B:
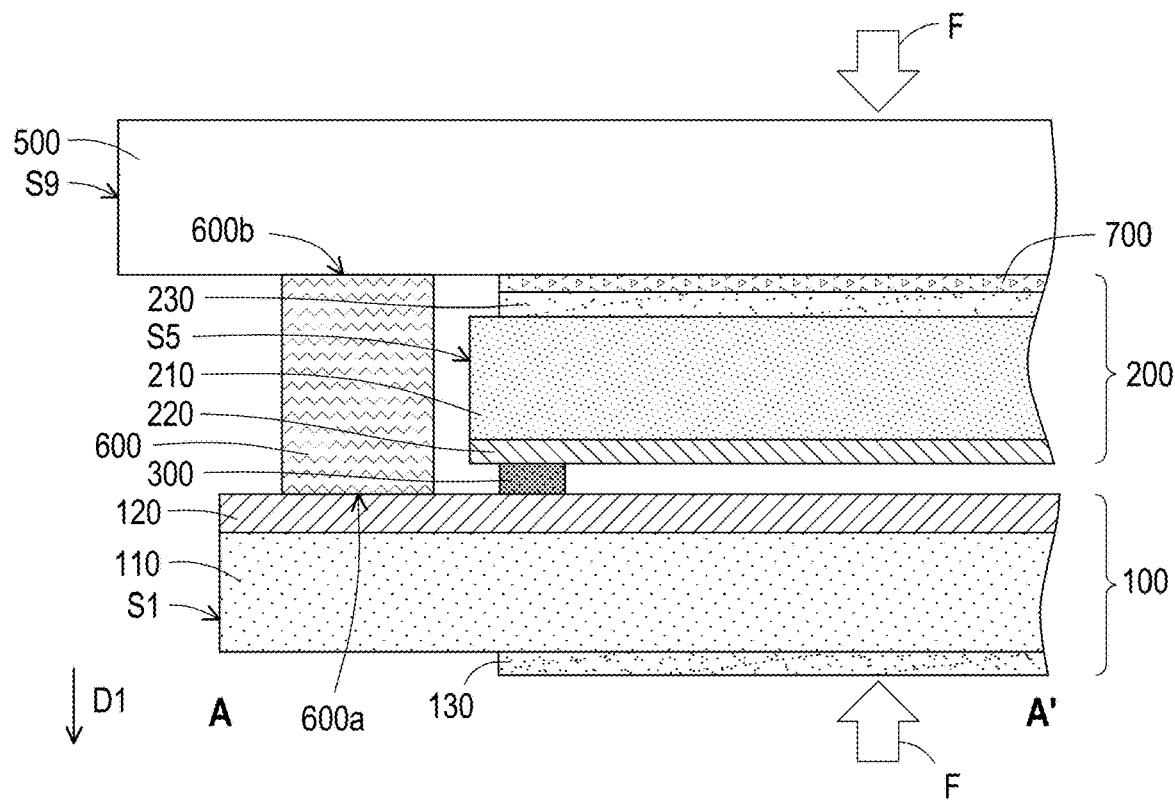
Figure 3C:
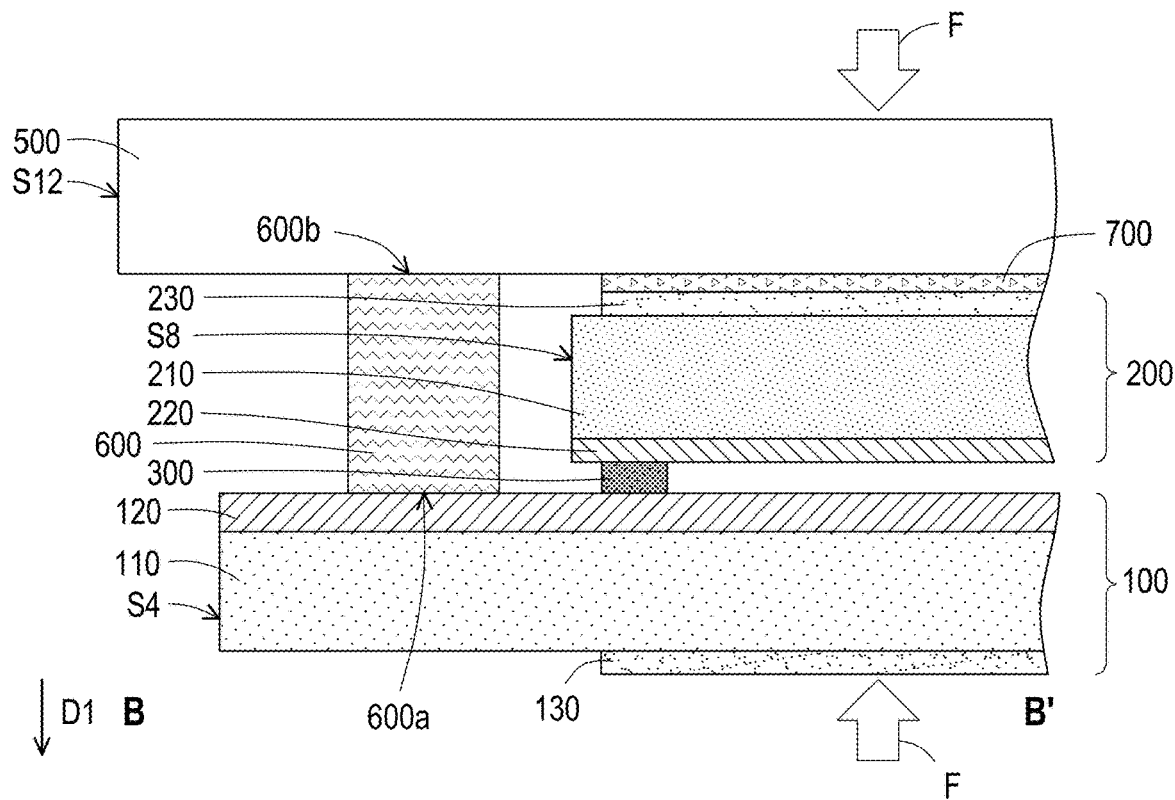

With reference to FIG. 3A to FIG. 3C, the de-bonding layer 602 is removed, the second substrate 200 is bonded to the coverlens 500 through the adhesive layer 700, and the first substrate 100 and the coverlens 500 are adhered to each other through the adhesive structure 600. The first substrate 100 is adhered to the first side 600a of the adhesive structure 600. In this embodiment, the adhesive structure 600 and the de-bonding layer 602 are formed on the coverlens 500 first, so the process of removing the de-bonding layer 602 does not cause damages to the devices in the first substrate 100.

In this embodiment, the ninth sidewall S9 to the twelfth sidewall S12 of the coverlens 500 correspond to the first sidewall S1 to the fourth sidewall S4 of the first substrate 100, respectively, and the ninth sidewall S9 to the twelfth sidewall S12 of the coverlens 500 correspond to the fifth sidewall S5 to the eighth sidewall S8 of the second substrate 200, respectively.

In some embodiments, the adhesive structure 600 is separated from the first sidewall S1, the second sidewall S2, the third sidewall S3, and the fourth sidewall S4 of the first substrate 100 and the fifth sidewall S5, the sixth sidewall S6, the seventh sidewall S7, and the eighth sidewall S8 of the second substrate 200. In some embodiments, the adhesive structure 600 is laterally located between the first sidewall S1 and the fifth sidewall S5, between the second sidewall S2 and the sixth sidewall S6, between the third sidewall S3 and the seventh sidewall S7, and between the fourth sidewall S4 and the eighth sidewall S8.

The adhesive structure 600 avoids the location of the bonding pads 122 of the first substrate 100. For instance, the adhesive structure 600 has an opening (an opening facing down in FIG. 3A), and the bonding pads 122 are disposed in the opening.

In this embodiment, after the first substrate 100 and the coverlens 500 are adhered to each other, a pressure F is applied to the first substrate 100 and the coverlens 500 for dozens of seconds, so as to eliminate air bubbles in the adhesive structure 600.

In other embodiments, when the adhesive structure 600 is the liquid adhesive, after the first substrate 100 and the coverlens 500 are adhered to each other, the first substrate 100, the second substrate 200, and the coverlens 500 are left to allow silane in the resin in the adhesive structure 600 to act as a crosslinking agent and react with moisture, and the silane is dealcoholized to carry out a series of chain reactions and transformed into a cured liquid adhesive. In some embodiments, the first substrate 100, the second substrate 200, and the coverlens 500 are left to stand at a room temperature, so that the liquid adhesive is cured.

Figure 4A:
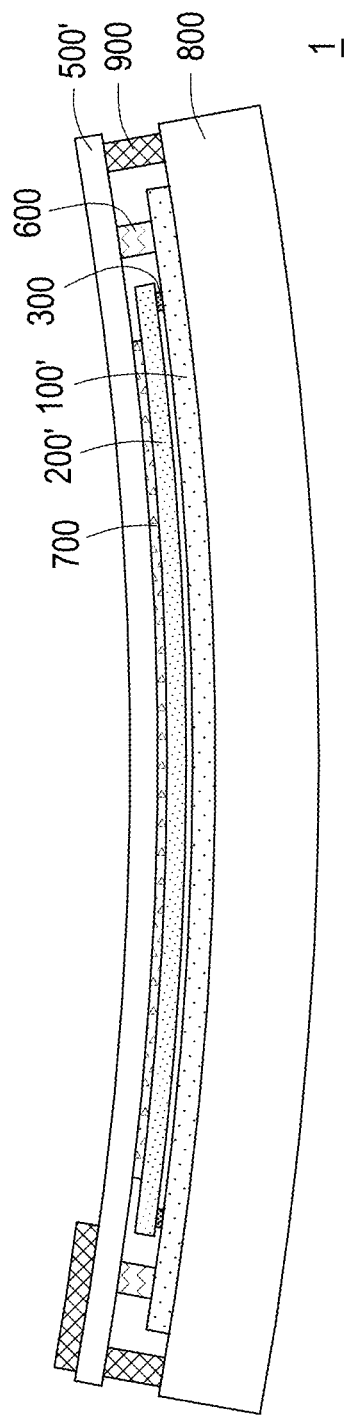
FIG. 4A is a schematic cross-sectional view of a curved panel according to an embodiment of the disclosure.
Figure 4B:
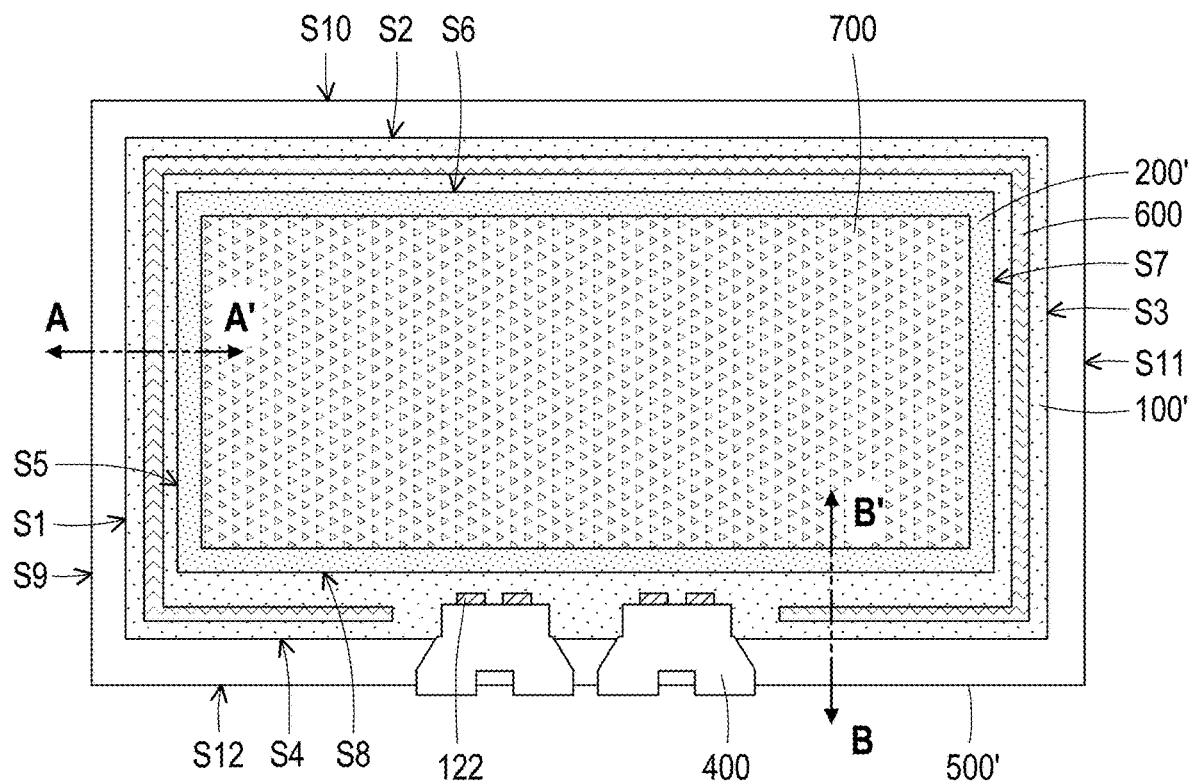
FIG. 4B is a schematic top view of a curved panel according to an embodiment of the disclosure.

FIG. 4A is a schematic cross-sectional view of a curved panel according to an embodiment of the disclosure. FIG. 4B is a schematic top view of a curved panel according to an embodiment of the disclosure. For convenience of description, a backlight module 800 and a fixing member 900 in FIG. 4A are omitted in FIG. 4B.

With reference to FIG. 4A and FIG. 4B, the first substrate 100, the second substrate 200, and the coverlens 500 are bent to form a first curved substrate 100', a second curved substrate 200', and a curved coverlens 500'. So far, the curved panel 1 is substantially formed.

The curved panel 1 includes the first curved substrate 100', the second curved substrate 200', and the curved coverlens 500'. The sealant 300 is located between the first curved substrate 100' and the second curved substrate 200'. The second curved substrate 200' is located between the curved coverlens 500' and the first curved substrate 100'. The second curved substrate 200' is bonded to the curved coverlens 500' through the adhesive layer 700. The first curved substrate 100' is bonded to the curved coverlens 500' through the adhesive structure 600. In some embodiments, curvature radii of the first curved substrate 100', the second curved substrate 200', and the curved coverlens 500' are 750 millimeters to 5500 millimeters.

In this embodiment, the first sidewall S1 to the fourth sidewall S4 of the first curved substrate 100' correspond to the fifth sidewall S5 to the eighth sidewall S8 of the second curved substrate 200', respectively. In a stacking direction of the first curved substrate 100' and the second curved substrate 200', the first sidewall S1 to the fourth sidewall S4 of the first curved substrate 100' respectively extend beyond the fifth sidewall S5 to the eighth sidewall S8 of the second curved substrate 200'.

The adhesive structure 600 is located between the first curved substrate 100' and the curved coverlens 500' and laterally located between the first sidewall S1 and the fifth sidewall S5, between the second sidewall S2 and the sixth sidewall S6, between the third sidewall S3 and the seventh sidewall S7, and between the fourth sidewall S4 and the eighth sidewall S8. The adhesive structure 600 is separated from the first sidewall S1 to the fourth sidewall S4 of the first curved substrate 100' and the fifth sidewall S5 to the eighth sidewall S8 of the second curved substrate 200'. In this embodiment, the adhesive structure 600 is separated from the sealant 300.

In this embodiment, the adhesive structure 600 includes a double-sided adhesive, a peeling strength of the adhesive structure 600 is 5.0 kgf/cm$^2$ to 6.0 kgf/cm$^2$, and an elastic modulus of a material of the adhesive structure 600 is 0.3 MPa to 0.8 MPa.

In other embodiments, the adhesive structure 600 includes the liquid adhesive, wherein after the liquid adhesive is cured, a peeling strength of the cured liquid adhesive is 20 kgf/cm$^2$ to 26 kgf/cm$^2$, and an elastic modulus of the cured liquid adhesive is 0.265 MPa to 20 MPa.

Since the adhesive structure 600 has sufficient elastic modulus, an issue of breakage is not prone to occur even after the bending process is performed.

In some embodiments, the curved panel 1 further includes a bent backlight module 800 and a fixing member 900. The fixing member 900 is adapted to fix the curved coverlens 500'. The first curved substrate 100', the second curved substrate 200', and the curved coverlens 500' are overlapped with the bent backlight module 800.

In view of the foregoing, the adhesive structure 600 is capable of reducing the stress on the first curved substrate 100', so as to mitigate the issue of the uneven distribution of the residual stress on the curved panel 1 and further prevent the light leakage at the corners or edges of the curved panel 1. In this embodiment, the brightness uniformity of the black screen of the curved panel 1 is greater than or equal to 50%.

Figure 5:
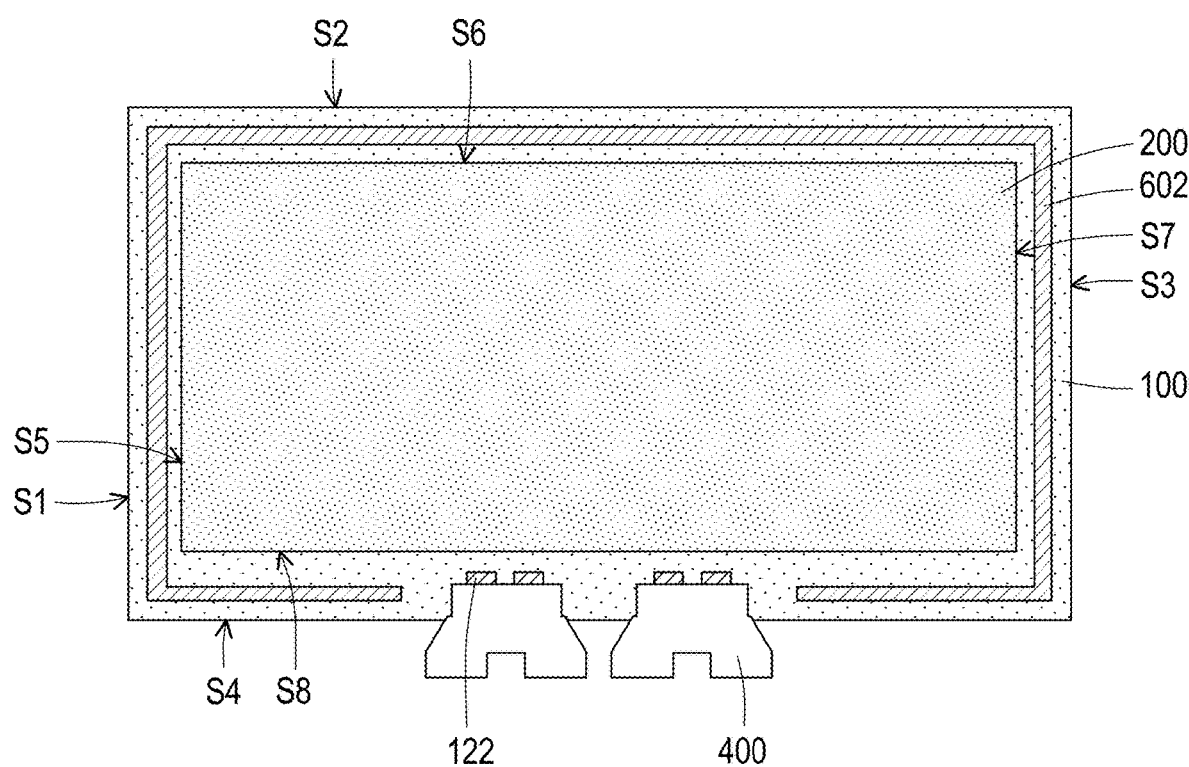
FIG. 5 is a schematic top view of a first substrate and a second substrate according to an embodiment of the disclosure.

FIG. 5 is a schematic top view of a first substrate and a second substrate according to an embodiment of the disclosure. It should be mentioned that the reference numbers and some content in the embodiment depicted in FIG. 5 are derived from the reference numbers and some content in the embodiment depicted in FIG. 1A to FIG. 4, where the same or similar reference numbers serve to represent the same or similar components, and the description of the same technical content is omitted. For the description of the omitted part, reference may be made to the foregoing embodiments, which will not be repeated here.

The main difference between the embodiment depicted in FIG. 5 and the embodiment depicted in FIG. 1A to FIG. 4 lies in that the adhesive structure is firstly formed on the first substrate 100 according to the embodiment depicted in FIG. 5.

With reference to FIG. 5, the adhesive structure 600 and the de-bonding layer 602 are adhered to the first substrate 100, wherein the adhesive structure 600 is located between the de-bonding layer 602 and the first substrate 100.

The de-bonding layer 602 is removed, and the coverlens 500 is adhered to the second side 600b of the adhesive structure 600 (as shown in FIG. 3B and FIG. 3C). After the coverlens 500 is adhered to the first substrate 100 and the second substrate 200, the first substrate 100, the second substrate 200, and the coverlens 500 are bent to form the first curved substrate 100', the second curved substrate 200', and the curved coverlens 500' (as shown in FIG. 4A and FIG. 4B).

FIG. 6A to FIG. 8A are schematic top views of a manufacturing method of a curved panel according to an embodiment of the disclosure. FIG. 6B to FIG. 8B are schematic cross-sectional views of a line A-A' depicted in FIG. 6A to FIG. 6C. FIG. 6C to FIG. 8C are schematic cross-sectional views of a line B-B' depicted in FIG. 6A to FIG. 6C. It should be mentioned that the reference numbers and some content in the embodiment depicted in FIG. 6A to FIG. 8C are derived from the reference numbers and some content in the embodiment depicted in FIG. 1A to FIG. 3C, where the same or similar reference numbers serve to represent the same or similar components, and the description of the same technical content is omitted. For the description of the omitted part, reference may be made to the foregoing embodiments, which will not be repeated here.

Figure 6A:
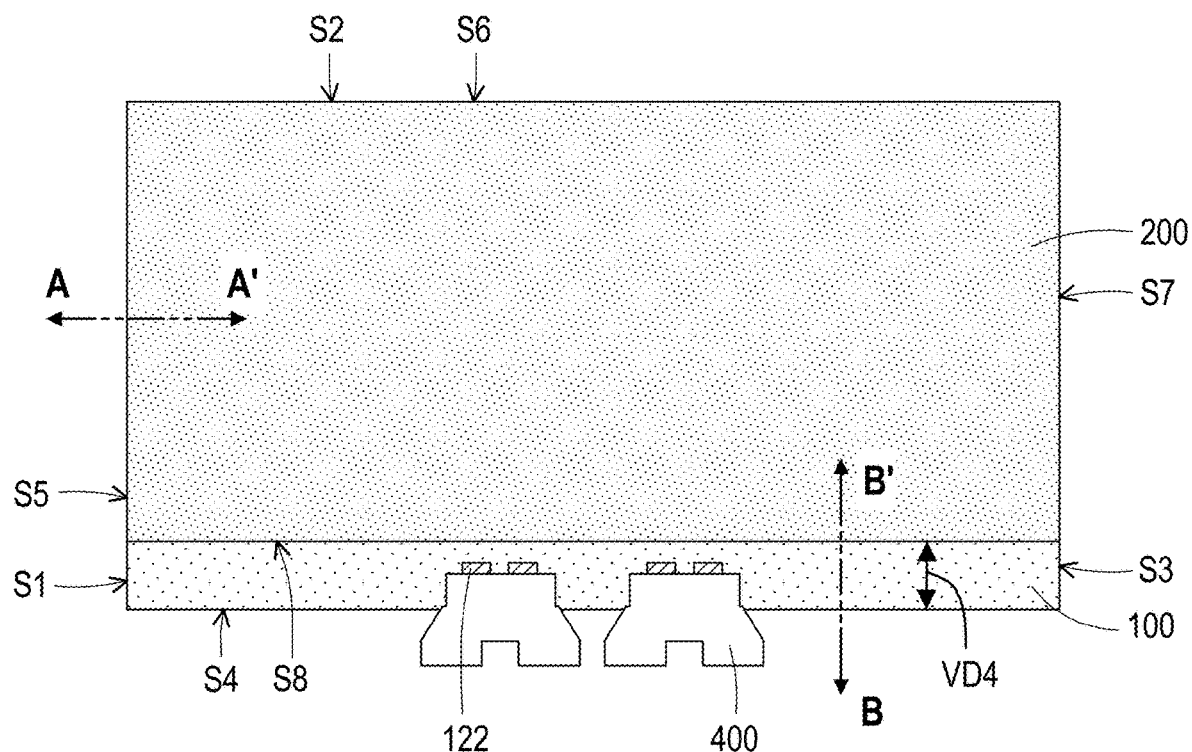
Figure 6B:
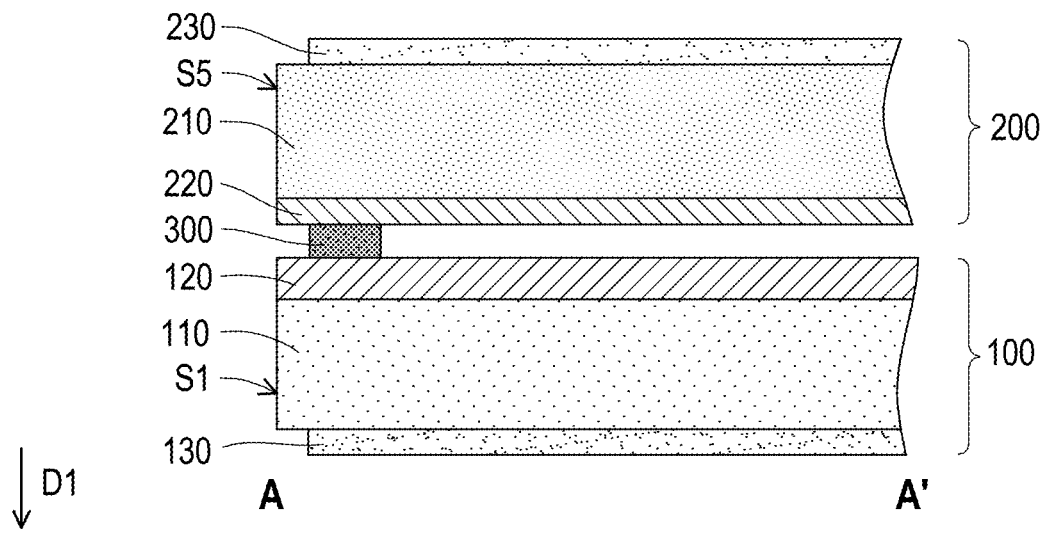
Figure 6C:
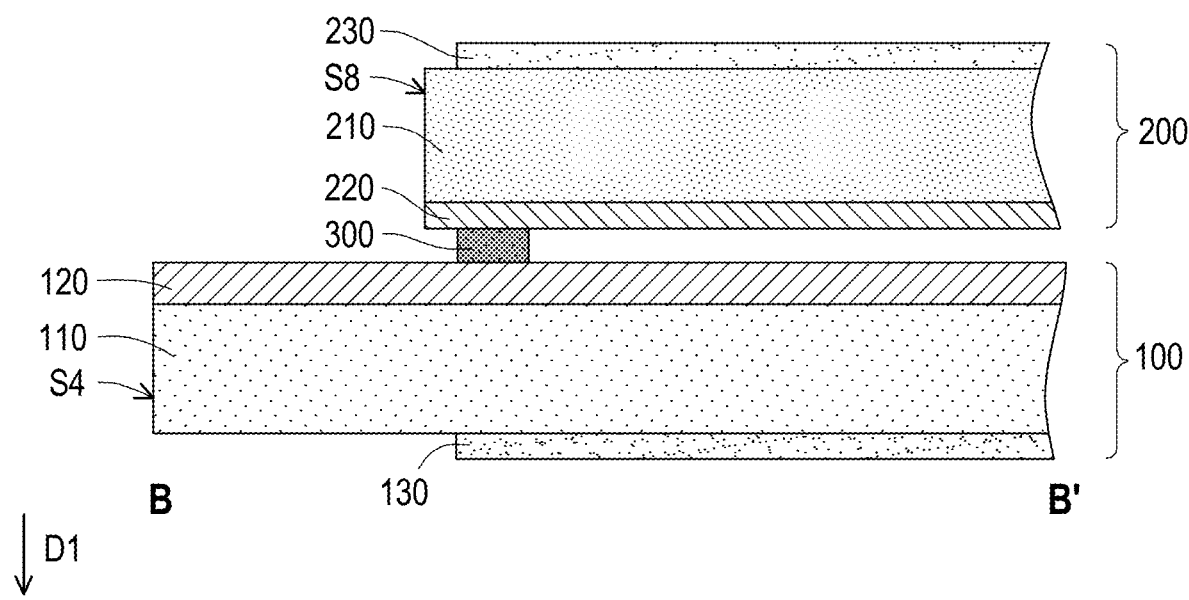

With reference to FIG. 6A to FIG. 6C, the first substrate 100 and the second substrate 200 overlapped with each other are provided. The first sidewall S1, the second sidewall S2, the third sidewall S3, and the fourth sidewall S4 of the first substrate 100 correspond to the fifth sidewall S5, the sixth sidewall S6, the seventh sidewall S7, and the eighth sidewall S8 of the second substrate 200, respectively. In this embodiment, the first sidewall S1 of the first substrate 100 and the fifth sidewall S5 of the second substrate 200 face the same direction, the second sidewall S2 of the first substrate 100 and the sixth sidewall S6 of the second substrate 200 face the same direction, the third sidewall S3 of the first substrate 100 and the seventh sidewall S7 of the second substrate 200 face the same direction, and the fourth sidewall S4 of the first substrate 100 and the eighth sidewall S8 of the second substrate 200 face the same direction.

The area occupied by the first substrate 100 is greater than the area occupied by the second substrate 200. In the stacking direction D1 of the first substrate 100 and the second substrate 200, the first sidewall S1 to the third sidewall S3 of the first substrate 100 do not extend beyond the fifth sidewall S5 to the seventh sidewall S7 of the second substrate 200, and the fourth sidewall S4 of the first substrate 100 extends beyond the eighth sidewall S8 of the second substrate 200. In other words, in this embodiment, the first sidewall S1 to the third sidewall S3 of the first substrate 100 are aligned to the fifth sidewall S5 to the seventh sidewall S7 of the second substrate 200, respectively, and the fourth sidewall S4 of the first substrate 100 is not aligned to the eighth sidewall S8 of the second substrate 200. In some embodiments, the horizontal distance VD4 between the fourth sidewall S4 and the eighth sidewall S8 is 2.0 millimeters to 8.0 millimeters.

Figure 7A:
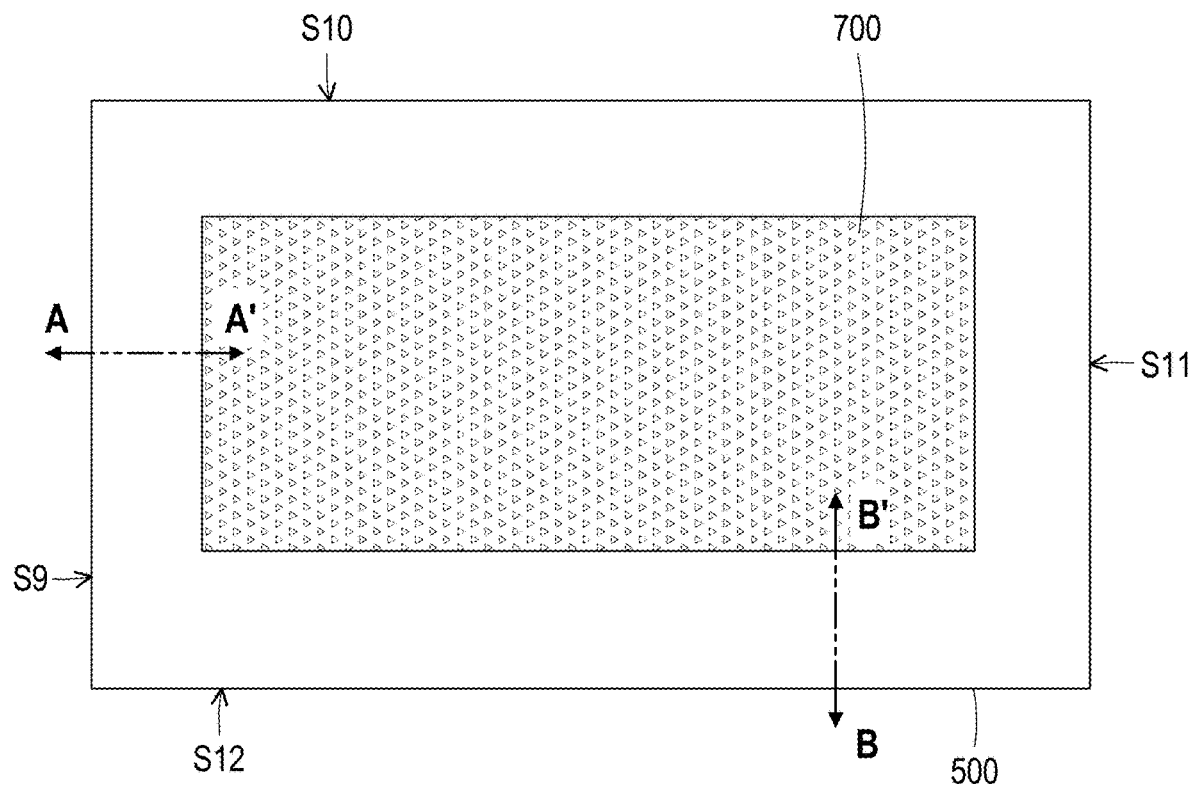
Figure 7B:
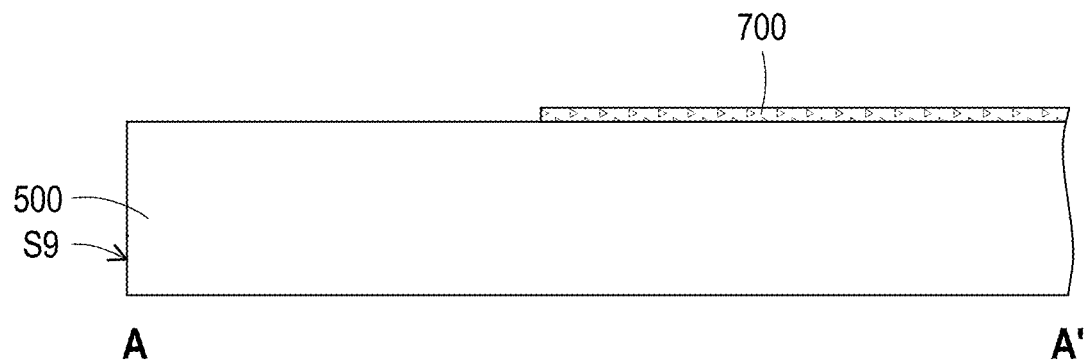
Figure 7C:
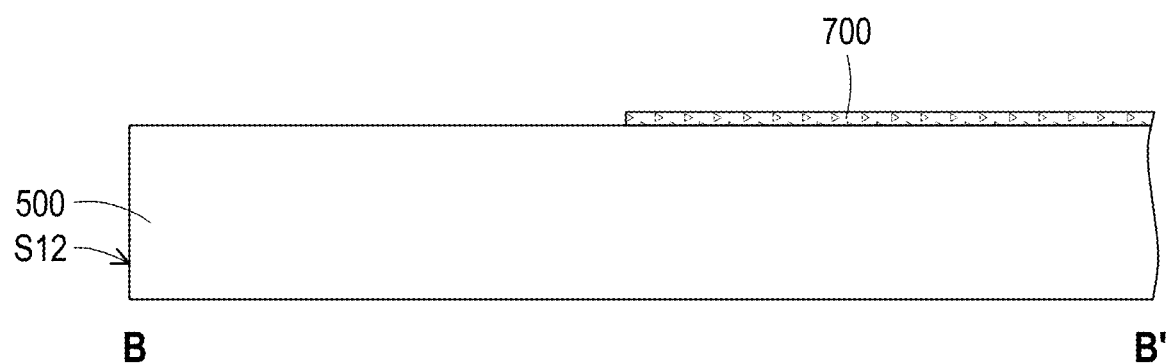

With reference to FIG. 7A to FIG. 7C, the coverlens 500 is provided. The coverlens 500 includes the ninth sidewall S9, the tenth sidewall S10, the eleventh sidewall S11, and the twelfth sidewall S12.

The adhesive layer 700 is formed on the coverlens 500. In some embodiments, the adhesive layer 700 is a solid sheet-like OCA, which should however not be construed as a limitation in the disclosure. In other embodiments, the adhesive layer 700 is a liquid adhesive, such as LOCA or OCR. In some embodiments, the thickness of the adhesive layer 700 is 100 micrometers to 1000 micrometers.

Figure 8A:
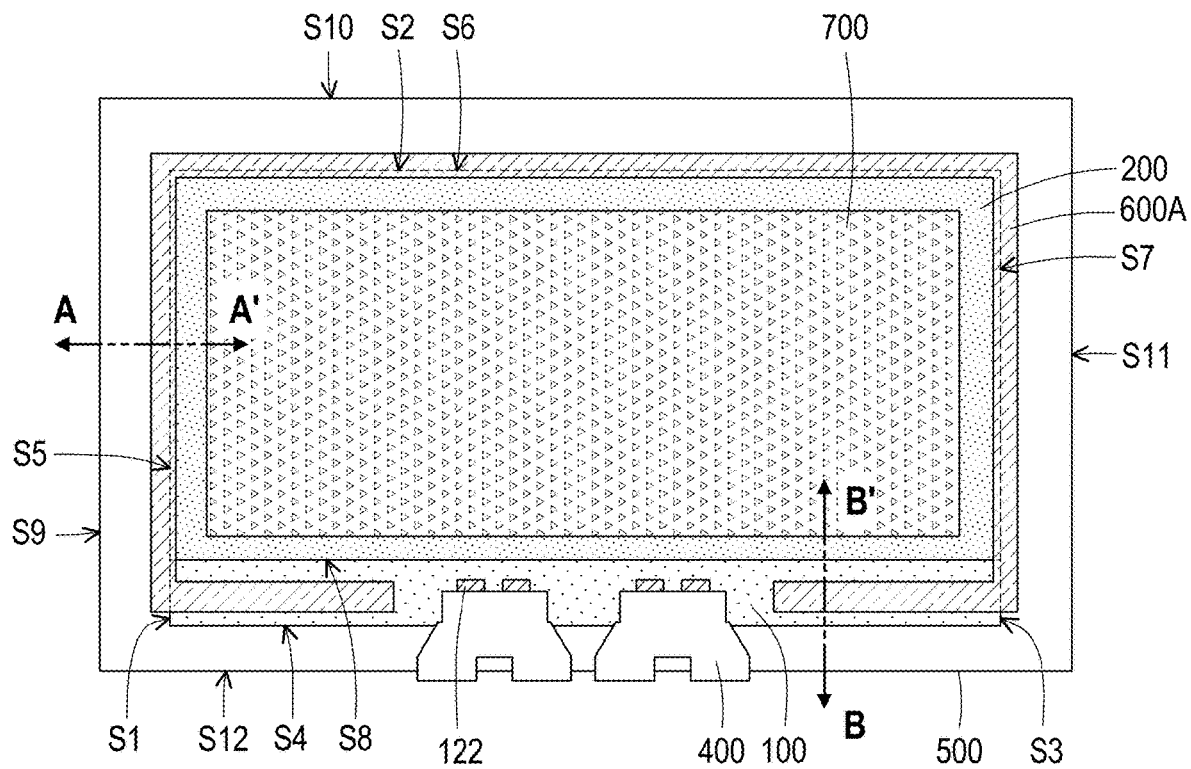
Figure 8B:
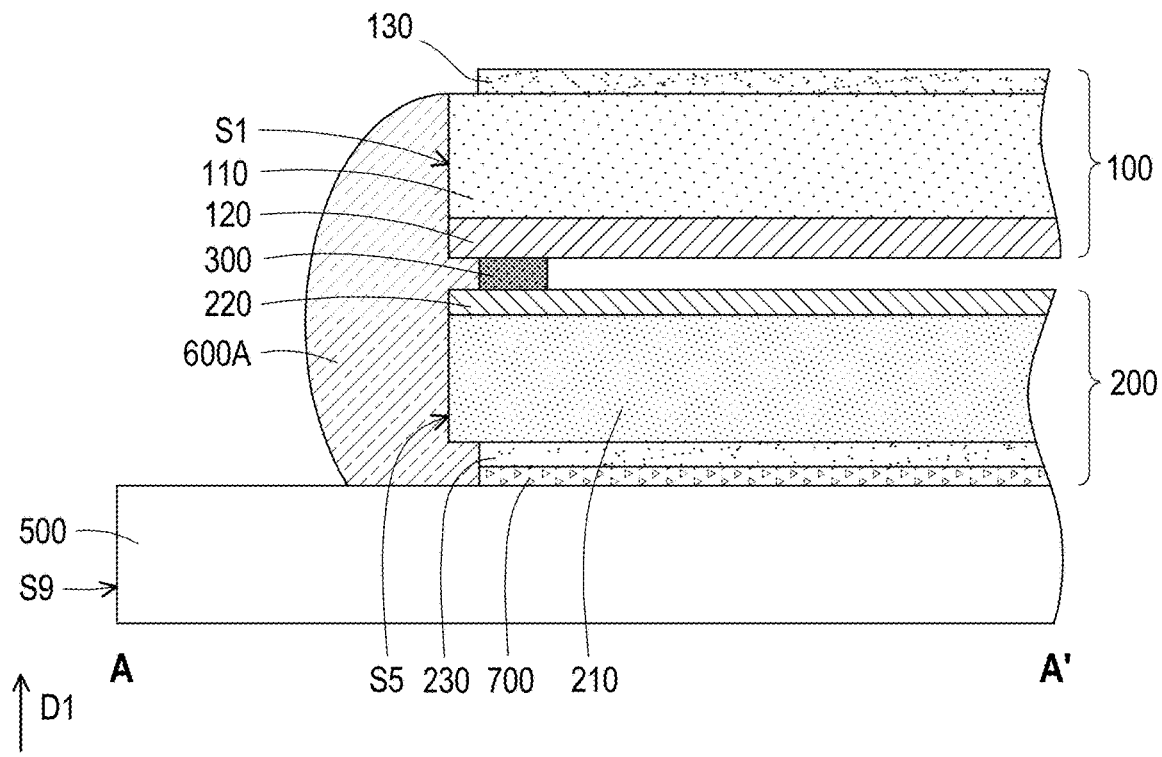
Figure 8C:
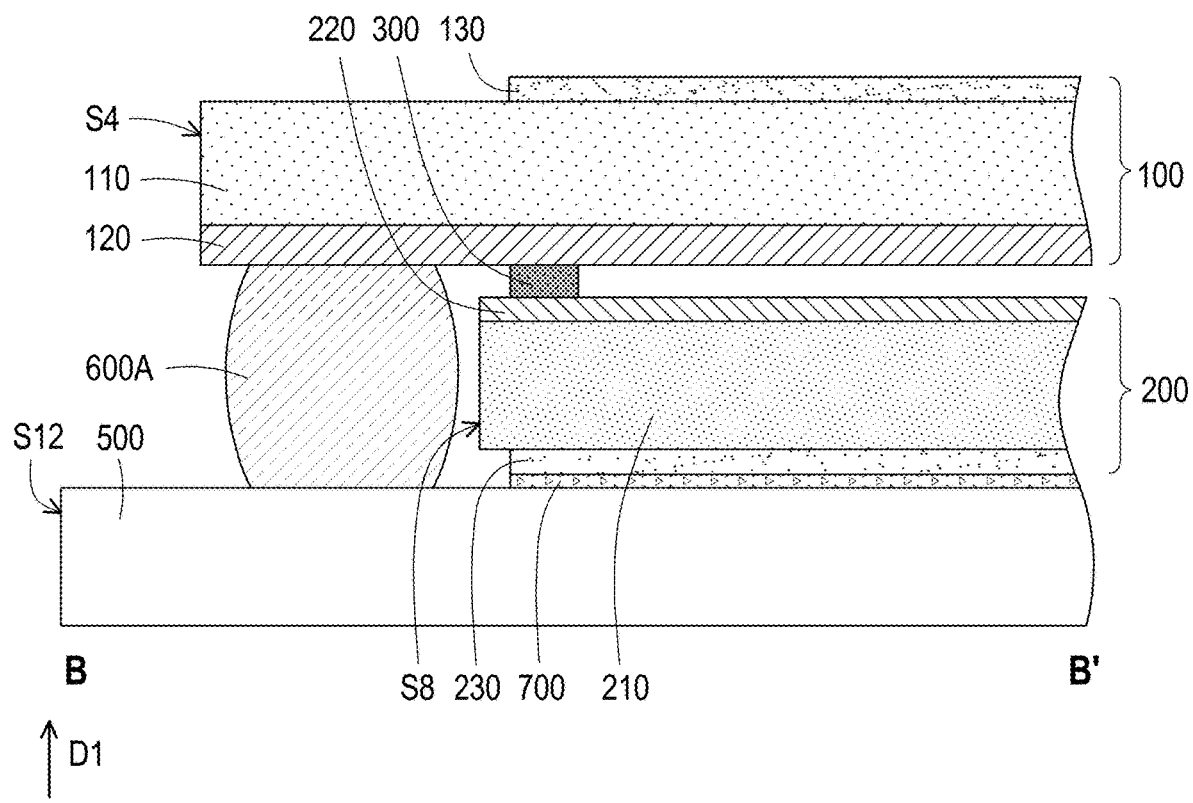

With reference to FIG. 8A to FIG. 8C, the second substrate 200 is bonded to the coverlens 500 through the adhesive layer 700, and the first substrate 100 and the coverlens 500 are adhered to each other through an adhesive structure 600A. In this embodiment, after the second substrate 200 is bonded to the coverlens 500 through the adhesive layer 700, the adhesive structure 600A is formed between the first substrate 100 and the coverlens 500, wherein a method of forming the adhesive structure 600A includes coating, blade coating, or other suitable processes.

In some embodiments, the adhesive structure 600A covers the first sidewall S1, the second sidewall S2, and the third sidewall S3 of the first substrate 100 and the fifth sidewall S5, the sixth sidewall S6, and the seventh sidewall S7 of the second substrate 200. In some embodiments, the adhesive structure 600A is laterally located between the fourth sidewall S4 of the first substrate 100 and the eighth sidewall S8 of the second substrate 200, which should however not be construed as a limitation in the disclosure. In other embodiments, the adhesive structure 600A covers the eighth sidewall S8 of the second substrate 200. The adhesive structure 600A avoids the location of the bonding pads 122 of the first substrate 100. For instance, the adhesive structure 600A has an opening (an opening facing down in FIG. 8A), and the bonding pads 122 are disposed in the opening.

In this embodiment, a portion of the adhesive structure 600A fills the gap between the first substrate 100 and the second substrate 200 and contacts the sealant 300, which should however not be construed as a limitation in the disclosure. In other embodiments, the adhesive structure 600A is not in contact with the sealant 300. In this embodiment, a portion of the adhesive structure 600A fills the gap between the second substrate 200 and the coverlens 500, which should however not be construed as a limitation in the disclosure. In other embodiments, the adhesive structure 600A does not fill the gap between the second substrate 200 and the coverlens 500.

In this embodiment, the adhesive structure 600A is a liquid adhesive, and after the first substrate 100 and the coverlens 500 are adhered to each other, the first substrate 100, the second substrate 200, and the coverlens 500 are left to allow silane in the resin in the adhesive structure 600A to act as a crosslinking agent and react with moisture, and the silane is dealcoholized to carry out a series of chain reactions and transformed into a cured liquid adhesive. In some embodiments, the first substrate 100, the second substrate 200, and the coverlens 500 are left to stand at a room temperature, so that the liquid adhesive is cured.

Figure 9A:
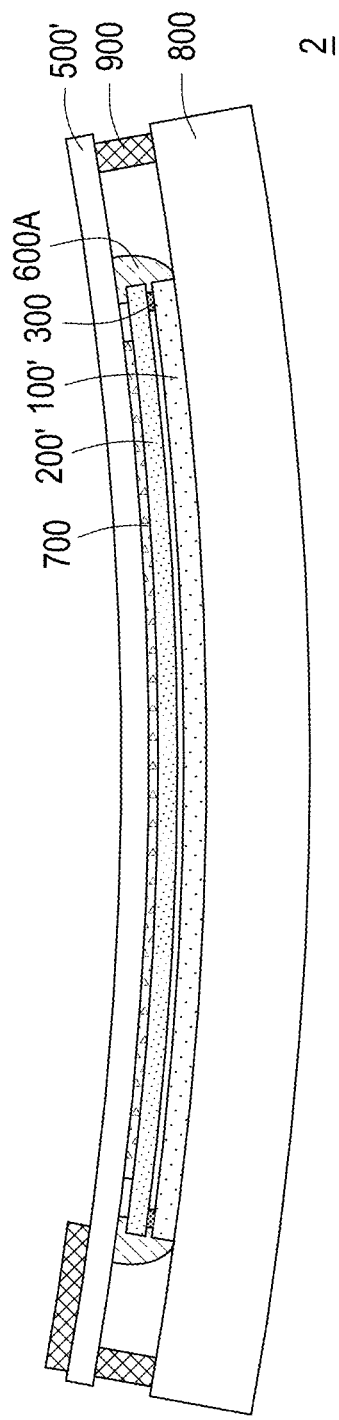
FIG. 9A is a schematic cross-sectional view of a curved panel according to an embodiment of the disclosure.
Figure 9B:
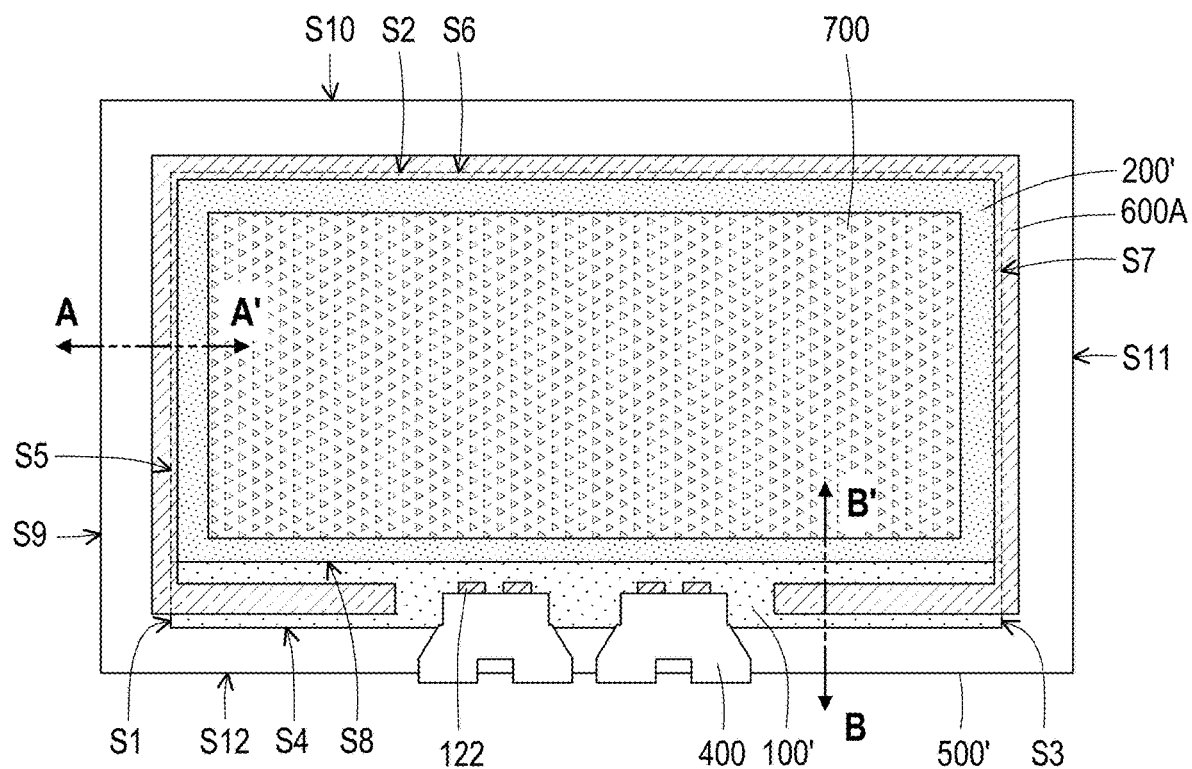
FIG. 9B is a schematic top view of a curved panel according to an embodiment of the disclosure.

FIG. 9A is a schematic cross-sectional view of a curved panel according to an embodiment of the disclosure. FIG. 9B is a schematic top view of a curved panel according to an embodiment of the disclosure. For convenience of description, the backlight module 800 and the fixing member 900 in FIG. 9A are omitted in FIG. 9B.

With reference to FIG. 9A and FIG. 9B, the first substrate 100, the second substrate 200, and the coverlens 500 are bent to form the first curved substrate 100', the second curved substrate 200', and the curved coverlens 500'. So far, the curved panel 2 is substantially formed.

The curved panel 2 includes the first curved substrate 100', the second curved substrate 200', and the curved coverlens 500'. The sealant 300 is located between the first curved substrate 100' and the second curved substrate 200'. The second curved substrate 200' is located between the curved coverlens 500' and the first curved substrate 100'. The second curved substrate 200' is bonded to the curved coverlens 500' through the adhesive layer 700. The first curved substrate 100' is bonded to the curved coverlens 500' through the adhesive structure 600A. In some embodiments, the curvature radii of the first curved substrate 100', the second curved substrate 200', and the curved coverlens 500' are 750 millimeters to 5500 millimeters.

In this embodiment, the first sidewall S1 to the fourth sidewall S4 of the first curved substrate 100' correspond to the fifth sidewall S5 to the eighth sidewall S8 of the second curved substrate 200', respectively. In a stacking direction of the first curved substrate 100' and the second curved substrate 200', the first sidewall S1 to the third sidewall S3 of the first curved substrate 100' do not extend beyond the fifth sidewall S5 to the seventh sidewall S7 of the second curved substrate 200', and the fourth sidewall S4 of the first curved substrate 100' extends beyond the eighth sidewall S8 of the second curved substrate 200'.

The adhesive structure 600A is located between the first curved substrate 100' and the curved coverlens 500' and covers the first sidewall S1, the second sidewall S2, and the third sidewall S3 of the first curved substrate 100' and the fifth sidewall S5, the sixth sidewall S6, and the seventh sidewall S7 of the second curved substrate 200'. In this embodiment, the adhesive structure 600A is laterally located between the fourth sidewall S1 of the first curved substrate 100' and the eighth sidewall S8 of the second curved substrate 200', which should however not be construed as a limitation in the disclosure. In other embodiments, the adhesive structure 600A covers the eighth sidewall S8 of the second curved substrate 200'.

In this embodiment, a portion of the adhesive structure 600A fills the gap between the first curved substrate 100' and the second curved substrate 200' and contacts the sealant 300, which should however not be construed as a limitation in the disclosure. In other embodiments, the adhesive structure 600A is not in contact with the sealant 300. In this embodiment, a portion of the adhesive structure 600A fills the gap between the second curved substrate 200' and the curved coverlens 500', which should however not be construed as a limitation in the disclosure. In other embodiments, the adhesive structure 600A does not fill the gap between the second curved substrate 200' and the curved coverlens 500'.

In this embodiment, the adhesive structure 600A includes the liquid adhesive, wherein after the liquid adhesive is cured, the peeling strength of the cured liquid adhesive is 20 kgf/cm$^2$ to 26 kgf/cm$^2$, and the elastic modulus of the cured liquid adhesive is 0.265 MPa to 20 MPa.

Since the adhesive structure 600A has sufficient elastic modulus, the issue of breakage is not prone to occur even after the bending process is performed.

In some embodiments, the curved panel 2 further includes the bent backlight module 800 and the fixing member 900. The fixing member 900 is adapted to fix the curved coverlens 500'. The first curved substrate 100', the second curved substrate 200', and the curved coverlens 500' are overlapped with the bent backlight module 800.

In view of the foregoing, the adhesive structure 600A is capable of reducing the stress on the first curved substrate 100', so as to mitigate the issue of the uneven distribution of the residual stress on the curved panel 2 and further prevent the light leakage at the corners or edges of the curved panel 2. In this embodiment, the brightness uniformity of the black screen of the curved panel 2 is greater than or equal to 50%.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A curved panel, comprising:
 a first curved substrate and a second curved substrate overlapped with each other, wherein a first sidewall, a second sidewall, a third sidewall, and a fourth sidewall of the first curved substrate correspond to a fifth sidewall, a sixth sidewall, a seventh sidewall, and an eighth sidewall of the second curved substrate, respectively, wherein the first sidewall, the second sidewall, and the third sidewall of the first curved substrate respectively extend beyond the fifth sidewall, the sixth sidewall, and the seventh sidewall of the second curved substrate;
 a curved coverlens, wherein the second curved substrate is located between the curved coverlens and the first curved substrate, and the second curved substrate is bonded to the curved coverlens through an adhesive layer; and
 an adhesive structure, located between the first curved substrate and the curved coverlens and laterally located between the first sidewall and the fifth sidewall, between the second sidewall and the sixth sidewall, and between the third sidewall and the seventh sidewall, wherein the adhesive structure does not contact a ninth sidewall, a tenth sidewall, an eleventh sidewall, and a twelfth two sidewall of the curved coverlens, and does not contact the first sidewall, the second sidewall, the third sidewall, and the fourth sidewall of the first curved substrate.

2. The curved panel according to claim 1, wherein the fourth sidewall of the first curved substrate extends beyond the eighth sidewall of the second curved substrate, and the adhesive structure is laterally located between the fourth sidewall and the eighth sidewall, wherein the first curved substrate comprises a plurality of bonding pads, and the bonding pads are laterally located between the fourth sidewall and the eighth sidewall.

3. The curved panel according to claim 1, wherein the adhesive structure comprises a double-sided adhesive or a cured liquid adhesive, wherein a peeling strength of the cured liquid adhesive is 20 kgf/cm$^2$ to 26 kgf/cm$^2$, and an elastic modulus of the cured liquid adhesive is 0.265 MPa to 20 MPa.

4. The curved panel according to claim 1, wherein the adhesive structure is separated from the fifth sidewall, the sixth sidewall, the seventh sidewall, and the eighth sidewall of the second curved substrate.

5. The curved panel according to claim 4, further comprising:
a sealant, located between the first curved substrate and the second curved substrate, wherein the sealant and the adhesive structure are separated from each other.

6. The curved panel according to claim 1, wherein a curvature radius of the curved coverlens is 750 millimeters to 5500 millimeters.

7. A curved panel, comprising:
a first curved substrate and a second curved substrate overlapped with each other, wherein a first sidewall, a second sidewall, a third sidewall, and a fourth sidewall of the first curved substrate correspond to a fifth sidewall, a sixth sidewall, a seventh sidewall, and an eighth sidewall of the second curved substrate, respectively;
a curved coverlens, wherein the second curved substrate is located between the curved coverlens and the first curved substrate, and the second curved substrate is bonded to the curved coverlens through an adhesive layer; and
an adhesive structure, located on a surface of the curved coverlens facing the second curved substrate, and covering the first sidewall of the first curved substrate and the fifth sidewall of the second curved substrate, wherein the adhesive structure comprises a cured liquid adhesive, wherein an elastic modulus of the cured liquid adhesive is 0.265 MPa to 20 MPa, and a peeling strength of the cured liquid adhesive is 20 kgf/cm$^2$ to 26 kgf/cm$^2$.

8. The curved panel according to claim 7, wherein the first sidewall, the second sidewall, and the third sidewall of the first curved substrate do not extend beyond the fifth sidewall, the sixth sidewall, and the seventh sidewall of the second curved substrate, respectively, and the fourth sidewall of the first curved substrate extends beyond the eighth sidewall of the second curved substrate.

9. The curved panel according to claim 8, wherein the adhesive structure covers the second sidewall and the third sidewall of the first curved substrate and the sixth sidewall and the seventh sidewall of the second curved substrate.

10. The curved panel according to claim 7, wherein a portion of the adhesive structure fills a gap between the first curved substrate and the second curved substrate.

11. A manufacturing method of the curved panel according to claim 1, comprising:
providing a first substrate and a second substrate overlapped with each other, wherein a first sidewall, a second sidewall, a third sidewall, and a fourth sidewall of the first substrate correspond to a fifth sidewall, a sixth sidewall, a seventh sidewall, and an eighth sidewall of the second substrate respectively;
bonding the second substrate to a coverlens through the adhesive layer;
bonding the first substrate to the coverlens through the adhesive structure, comprising:
adhering the adhesive structure and a de-bonding layer to one of the first substrate and the coverlens, wherein the de-bonding layer is located on a first side of the adhesive structure so that the adhesive structure is located between the de-bonding layer and the one of the first substrate and the coverlens;
removing the de-bonding layer to expose the first side of the adhesive structure; and
adhering the other of the first substrate and the coverlens to the first side of the adhesive structure; and
bending the first substrate, the second substrate, and the coverlens to form the curved panel comprising the first curved substrate, the second curved substrate, and the curved coverlens.

12. The manufacturing method of the curved panel according to claim 11, wherein the adhesive structure comprises a double-sided adhesive or a liquid adhesive, wherein after the liquid adhesive is cured, a peeling strength of the cured liquid adhesive is 20 kgf/cm$^2$ to 26 kgf/cm$^2$, and an elastic modulus of the cured liquid adhesive is 0.265 MPa to 20 MPa.

13. The manufacturing method of the curved panel according to claim 11, wherein the adhesive structure is separated from the fifth sidewall, the sixth sidewall, the seventh sidewall and the eighth sidewall of the second substrate.

* * * * *